(12) United States Patent
Palacharla

(10) Patent No.: US 8,131,151 B2
(45) Date of Patent: Mar. 6, 2012

(54) TESTING AND MEASUREMENT IN OPTICAL NETWORKS

(75) Inventor: Paparao Palacharla, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 194 days.

(21) Appl. No.: 12/576,933

(22) Filed: Oct. 9, 2009

(65) Prior Publication Data

US 2011/0085801 A1 Apr. 14, 2011

(51) Int. Cl.
*H04J 14/02* (2006.01)

(52) U.S. Cl. ............... 398/83; 398/45; 398/48; 398/50; 398/79; 398/16; 398/25; 398/26; 398/27; 398/38; 398/33; 385/24; 385/16; 385/17; 385/18; 370/254; 370/225; 370/223; 370/380

(58) Field of Classification Search ............ 398/83, 398/45, 48, 50, 79, 82, 33, 30, 31, 32, 25, 398/26, 27, 38, 2, 3, 4, 5, 7, 8, 19, 20, 23, 398/24, 22, 58, 59, 17, 16; 385/24, 16, 17, 385/18; 370/254, 223, 225, 218, 219, 220, 370/221, 380

See application file for complete search history.

(56) References Cited

U.S. PATENT DOCUMENTS

| | | | |
|---|---|---|---|
| 6,718,141 B1 * | 4/2004 | deVette | 398/82 |
| 2009/0041457 A1 * | 2/2009 | Maki et al. | 398/45 |
| 2009/0232497 A1 * | 9/2009 | Archambault et al. | 398/50 |
| 2011/0052201 A1 * | 3/2011 | Ji et al. | 398/83 |

* cited by examiner

*Primary Examiner* — Hanh Phan
(74) *Attorney, Agent, or Firm* — Baker Botts L.L.P.

(57) ABSTRACT

An optical node may include a plurality of optical input components operable to receive a plurality of signals communicated in an optical network and a plurality of optical output components operable to transmit a plurality of signals to be communicated in the optical network. The optical node may also include at least one of: (a) an optical drop component coupled to the plurality of optical input components, the optical drop component operable to select a signal and select a portion of the signal of a particular selectable wavelength to drop to an associated item of test equipment from any one of the plurality of optical input components; and (b) an optical add component coupled to the plurality of optical output components and operable to selectively transmit copies of a selected one or more of a plurality of optical add signals to the plurality of optical output components, wherein the plurality of optical add signals includes a signal of a particular selectable wavelength communicated to the optical add component from an associated item of test equipment, and wherein each optical output component is operable to select a signal to communicate in the optical network received from any one of the optical add component and the plurality of optical input components.

25 Claims, 3 Drawing Sheets

TESTING AND MEASUREMENT IN OPTICAL NETWORKS

TECHNICAL FIELD OF THE INVENTION

The present invention relates generally to optical networks and, more particularly, to testing and measurement in optical networks.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss of signal strength.

In recent years, the use of telecommunication services has increased dramatically. As the demand for telecommunication services continue to grow, various topologies of optical networks are emerging. For example, ring network topologies are evolving into mesh network topologies. Ring network topologies have several inefficiencies, such as information having to travel through each intermediate node before reaching the destination node and the fallibility of the entire ring network if there are multiple failures. Mesh network topologies provide several benefits over a ring network. While the network topology can be improved, existing optical node architectures are not efficient and effective in the testing and measurement of mesh network topologies (e.g., testing and measurement of latency, optical power, chromatic dispersion, polarization mode dispersion, optical-signal-to-noise ratio, etc.). For example, conventional optical node architectures are not scalable to support testing and measurement of the increased connectivity of optical nodes in mesh network topologies.

SUMMARY

In accordance with the present invention, disadvantages and problems associated with conventional optical node architectures in mesh network topologies may be reduced or eliminated.

According to one embodiment of the present disclosure, an optical node may include a plurality of optical input components operable to receive a plurality of signals communicated in an optical network and a plurality of optical output components operable to transmit a plurality of signals to be communicated in the optical network. The optical node may also include at least one of: (a) an optical drop component coupled to the plurality of optical input components, the optical drop component operable to select a signal and select a portion of the signal of a particular selectable wavelength to drop to an associated item of test equipment from any one of the plurality of optical input components; and (b) an optical add component coupled to the plurality of optical output components and operable to selectively transmit copies of a selected one or more of a plurality of optical add signals to the plurality of optical output components, wherein the plurality of optical add signals includes a signal of a particular selectable wavelength communicated to the optical add component from an associated item of test equipment, and wherein each optical output component is operable to select a signal to communicate in the optical network received from any one of the optical add component and the plurality of optical input components.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
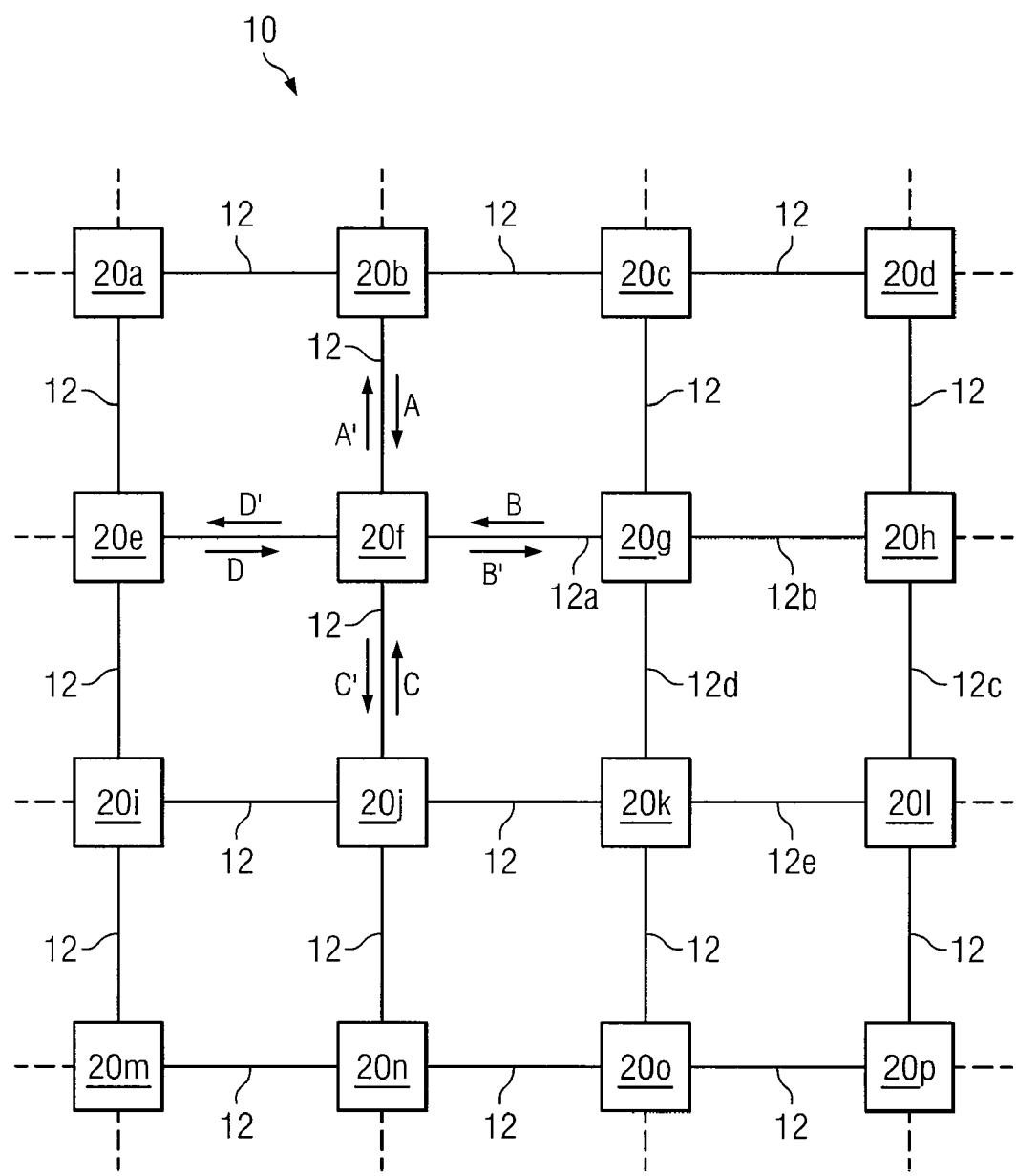
FIG. 1 is a block diagram illustrating a mesh optical network.

FIG. 1 is a block diagram illustrating a mesh optical network 10. Mesh optical network 10 may include one or more optical fibers 12 operable to transport one or more optical signals communicated by components of mesh network 10. The components of mesh network 10, coupled together by optical fibers 12, may include a plurality of nodes 20. In the illustrated network 10, each node 20 is coupled to four other nodes to create a mesh. However, any suitable configuration of any suitable number of optical nodes 20 may create mesh network 10. For example, one or more nodes 20 in mesh network 10 may have less or more interconnections with other nodes 20. Mesh network 10 may represent all or a portion of a short-haul metropolitan network, a long-haul inter-city network, and/or any other suitable network or combination of networks. Optical fibers 12 represent any suitable type of fiber. For example, the optical fiber coupling two nodes 20 may comprise, as appropriate, a single uni-directional fiber, a single bi-directional fiber, or a plurality of uni- or bi-directional fibers. More particularly, optical fiber 12 may include a Single-Mode Fiber (SMF), Enhanced Large Effective Area Fiber (E-LEAF), TrueWave® Reduced Slope (TW-RS) fiber, or other suitable fiber.

As mentioned above, mesh network 10 may be operable to communicate optical signals carrying information from one node 20 to one or more other nodes 20. In particular, mesh network 10 may allow client devices (not shown) coupled to a node 20 to communicate with one or more other client devices coupled to one or more of the other nodes 20.

Mesh network 10 may communicate information or "traffic" over optical fibers 12. As used herein, "traffic" means information transmitted, stored, or sorted in mesh network 10. Such traffic may comprise optical signals having at least one characteristic modulated to encode audio, video, textual, and/or any other suitable data. The data may also be real-time or non-real-time. Modulation may be based on phase shift keying (PSK), intensity modulation (IM), or other suitable methodologies. Additionally, the traffic communicated in mesh network 10 may be structured in any appropriate manner including, but not limited to, being structured in frames, packets, or an unstructured bit stream.

Traffic may be carried in a single optical signal that comprises a number of optical channels or wavelengths. The process of communicating traffic at multiple channels of a single optical signal is referred to in optics as wavelength division multiplexing (WDM). Dense wavelength division multiplexing (DWDM) refers to multiplexing a larger (denser) number of wavelengths, usually greater than forty, into a fiber. The optical signal includes different channels combined as a single signal on optical fiber 12. WDM, DWDM, or other suitable multi-channel multiplexing techniques may be employed in optical network 10 to increase the aggregate bandwidth per optical fiber 12. Without WDM or DWDM, the bandwidth in network would be limited to the bit rate of only one wavelength. With more bandwidth, optical networks are capable of transmitting greater amounts of information. For example, node 20 in mesh network 10 is operable to transmit and receive disparate channels using WDM, DWDM, or other suitable multi-channel multiplexing technique.

Nodes 20 in mesh network 10 may comprise any suitable nodes operable to transmit and receive traffic in a plurality of channels. In the illustrated embodiment, each node 20 may be operable to transmit traffic directly to four other nodes 20 and receive traffic directly from the four other nodes 20. For example, as illustrated in FIG. 1, node 20f may be capable of receiving input signals A-D from four nodes 20 and forwarding output signals A'-D' to the four nodes 20. Each output signal, A'-D', may include traffic in one or more channels from one or more of the input signals and/or traffic added at node 20f. In particular embodiments, nodes 20 include multi-degree architectures that are scalable with mesh optical network 10. Nodes 20 will be discussed in more detail below with respect to FIG. 2.

Nodes 20 in mesh network 10 may use any suitable route to transmit traffic to a destination node 20. As discussed above, fibers 12 may each be a single uni-directional fiber, a single bi-directional fiber, or a plurality of uni- or bi-directional fibers. For example, node 20f transmitting traffic to node 20l may transmit the traffic over fibers 12a, 12b, and 12c or, alternatively, over fibers 12a, 12d, and 12e. Many other paths are possible. Therefore, if fiber 12b fails, node 20f may continue to transmit traffic to node 20l over an alternate path. Fibers 12 may fail or break for any number of reasons, such as being cut, being tampered with, or other occurrences. Furthermore, one or more nodes or other equipment in a path may fail. Mesh network 10 addresses the possibility of failing fibers and/or equipment by allowing flexibility in transmitting traffic between nodes 20.

Figure 2:
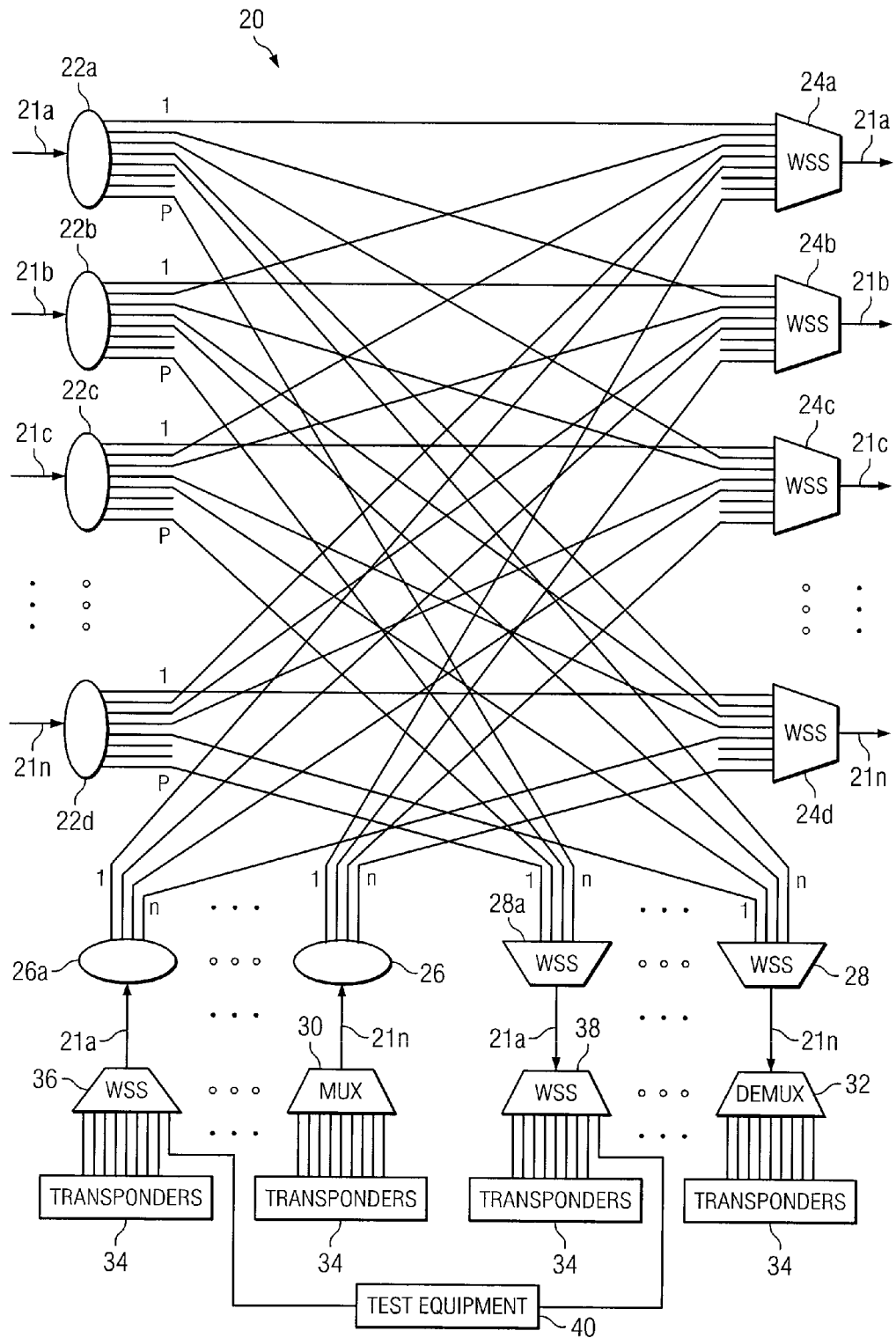
FIG. 2 is a block diagram illustrating an example node in the mesh network of FIG. 1 with an improved architecture for testing and measurement according to a particular embodiment of the present invention.

One challenge faced by those attempting to implement a mesh network topology rather than a ring network topology is that existing optical node architectures for a mesh network topology do not allow for efficient testing and measurement within a network. Particular current node architectures include photonic cross-connect architectures and multi-degree reconfigurable optical add/drop multiplexer (ROADM) architectures based on Wavelength Selective Switches (WSS). A limitation of the traditional ROADM nodes is that these nodes have only local add/drop capability for each degree or wavelength. Accordingly, exhaustive testing and measurement at a node using current node architectures would require test equipment to be coupled to each add-drop port of the node. For these reasons, a conventional ROADM node and conventional testing and measurement approaches require the use of multiple items of test equipment or the sequential disconnection and reconnection of test equipment to add-drop ports. FIG. 2 depicts a node architecture that interoperates with the increased flexibility of mesh network 10 and overcomes and/or reduces these disadvantages.

Modifications, additions, or omissions may be made to mesh network 10 without departing from the scope of the disclosure. The components and elements of mesh network 10 described may be integrated or separated according to particular needs. Moreover, the operations of mesh network 10 may be performed by more, fewer, or other components.

FIG. 2 is a block diagram illustrating an example node 20 in mesh network 10 of FIG. 1 with an improved architecture for testing and measurement according to a particular embodiment of the present invention. Node 20 addresses the challenges discussed above with respect to testing and measurement in conventional node architectures in mesh network 10.

In the illustrated embodiment, node 20 includes splitters 22 and 26, WSSs 24, 28, 36 and 38, multiplexers 30, demultiplexers 32, transponders 34, and test equipment 40 coupled to form an architecture for testing and measurement. Splitters 22 and 26 represent optical couplers or any other suitable optical component operable to split an optical signal into multiple copies of the optical signal and transmit the copies to other components within node 20. In the illustrated embodiment, each splitter 22 may receive an input signal from mesh network 10 and each splitter 26 may receive an optical signal added at node 20. Splitters 22 and 26 may be configured to receive traffic over a particular fiber and split the received traffic into multiple copies. For example, splitters 22 may be configured to receive traffic over input fibers 21 and to split the traffic into P copies. Splitters 26 are configured to receive traffic from associated multiplexers 30 and split the traffic into n copies. Multiplexers 30 represent any suitable optical component operable to receive and combine add traffic in disparate optical channels, transmitted by associated transponders 34 from one or more client devices, into a WDM or other optical signal for communication to splitter 26.

Splitters 26 may be included on the add side of node 20 to support full connectivity for traffic being added by node 20. Having splitters 26 on the add side of node 20 supports the flexibility of transmission desired in mesh network 10. Each splitter 26 may receive traffic from a multiplexer 30 and may be configured to pass a copy of the traffic to each WSS 24 over a fiber, port, or other connection. During operation, splitters 26 may pass traffic to WSSs 24 to be transmitted over another fiber 21. Therefore, traffic may continue to be added from transponders 34 even if a fiber 21 fails. For example, if traffic is previously transmitted over fiber 21a but fiber 21a fails, splitter 26a may forward traffic to be transmitted over another operable fiber, such as fiber 21c.

WSSs 24, 28, 36 and 38 may comprise any suitable optical components operable to receive multiple optical signals and output a portion or all of one or more of the received signals. In the illustrated embodiment, WSSs 24 may receive copies of one or more add signals from splitters 26, WSSs 28 may receive copies of one or more input signals from splitters 22, and WSS 36 may receive copies of one or more input signals from transponders 34 and test equipment 40. WSS 38 may not copy an input signal, but may selectively transmit particular channels of the input signal to one or more of its outputs.

WSSs 28 may be included on the drop side of node 20 to support full connectivity for traffic being dropped at node 20. Each WSS 28 may be configured to pass traffic received over a particular fiber 21 to an associated demultiplexer 32, except for WSS 28a which may be configured to pass traffic received over fiber 21a to WSS 38. During operation, WSSs 28 other than WSS 28a may be reconfigured to pass traffic from another fiber to the associated demultiplexers 32 (and then to associated transponders 34), and/or WSS 28a may be reconfigured to pass traffic from another fiber to its associated WSS 38. Therefore, any transponder 34 may receive traffic from any input fiber. In addition, test equipment 40 may receive traffic from any input fiber, which supports the testing and measurement flexibility desired in mesh network 10. Demultiplexers 32 represent any demultiplexers or other optical component operable to separate the disparate channels of WDM, DWDM, or other suitable multi-channel optical signals. Demultiplexers 32 may be operable to receive an optical signal carrying a plurality of multiplexed channels from WSS 28, demultiplex the disparate channels in the optical signal, and pass the disparate channels to associated transponders 34 (for communication to one or more client devices). Transponders 34 represent any suitable optical components operable to transmit and/or receive traffic on a channel. Transponders 34 may communicate traffic to and from client devices. Test equipment 40 may represent any suitable optical components operable to transmit and/or receive traffic on a channel for testing or measurement purposes (e.g., to analyze a received signal and/or transmit a signal to be tested, measured or otherwise characterized).

In operation, each splitter 22 in node 20 may receive a WDM or other multi-channel input optical signal from mesh network 10. Splitter 22 may split the received input signal into several copies. A copy of the input signal may be transmitted to each WSS 24 (where some or all of the channels may be passed through node 20 to mesh network 10) and transmitted to each WSS 28 (where some or all of the channels may be dropped at node 20). WSS 24 may perform signal (wavelength) blocking and/or filtering. For example, each WSS 24 may be configured to select one or more of the signals (wavelengths) received from splitters 22 (pass-through) and/or one or more of the signals (wavelengths) received from splitters 26 (add) for communication to network 10. Each WSS 28 (other than WSS 28a) may be configured to drop traffic received from a particular input fiber 21 to an associated demultiplexer 32. WSS 28a may be configured to drop traffic received from particular input fiber 21a to associated WSS 38. Each demultiplexer 32 may receive the traffic, separate the traffic into the constituent channels, and drop each channel to its associated transponder 34. WSS 38 may receive traffic transmitted from WSS 28a, and selectively transmit particular channels of the traffic to their associated transponders 34 and/or test equipment 40. For example, splitter 22a may receive traffic over input fiber 21a. Splitter 22a may copy the traffic and transmit a copy to each WSS 24 and each WSS 28. In the illustrated embodiment, WSS 28a may be configured to transmit traffic received over input fiber 21a to WSS 38 and WSSs 28 other than WSS 28a may be configured to transmit traffic received over input fiber 21a to a demultiplexer 32. Accordingly, each WSS 28 may receive copies of each input signal, but may select the signal received over fiber 21a for transmission to a particular demultiplexer 32. Such multiplexer may transmit the traffic to transponders 34 for communication to one or more client devices. In addition, WSS 28a may receive copies of each input signal, but may selects the signal received over fiber 21a for transmission to WSS 38. WSS 38 may selectively transmit the traffic to transponders 34 for communication to one or more client devices and/or test equipment 40 for testing, measurement, or analysis.

As mentioned above, node 20 may also add traffic to mesh network 10. Transponders 34 may transmit such traffic to an associated multiplexer 30 or WSS 36 and/or test equipment 40 may transmit test traffic to WSS 36, and WSS 36 and each multiplexer 30 may combine traffic in multiple channels into a WDM signal and transmit the WDM signal to an associated splitter 26 over a fiber 21. Each splitter 26 may create copies of a signal and transmit a copy to each WSS 24. As mentioned above, each WSS 24 may be configured to transmit a particular received signal over a particular output fiber 21. WSS 24 may forward the selected signal to mesh network 10 over the particular fiber 21.

The architecture of node 20 may also improve testing and measurement flexibility by permitting the addition of test signals or test traffic to node 20 from test equipment 40. For example, test equipment 40 may transmit a test signal or test traffic to WSS 36. WSS 36 may transmit such signal or traffic (either along or combined with other signals from transponders 34 associated with WSS 36) to splitter 26a via fiber 21a. Splitter 26a may copy the test signal and provide a copy to each WSS 24.

Modifications, additions, or omissions may be made to node 20 illustrated in FIG. 2. For example, multiplexers 30 and demultiplexers 32 may be replaced with WSSs for dynamic optical add/drop multiplexing capability. As another example, splitters 22 and 26 may be replaced with WSSs. Node 20 may include any suitable number of splitters 22 and 26 and WSSs 24 and 28 to handle any suitable number of degrees of node 20. As yet another example, splitters 22 and 26 and WSSs 24 and 28 may be a hierarchical combination of devices to provide a higher number of splitter or WSS inputs or outputs to enable node scalability to higher degrees. For example, splitters 22 and 26 may be a combination of cascaded couplers or a combination of a coupler and two or more WSSs arranged hierarchically. As another example, WSSs 24 and 28 may be a combination of a coupler and two or more WSSs arranged hierarchically or a combination of cascaded WSSs. Moreover, the operations of node 20 described may be performed by more, fewer, or other components without departing from the scope of the present disclosure.

Figure 3:
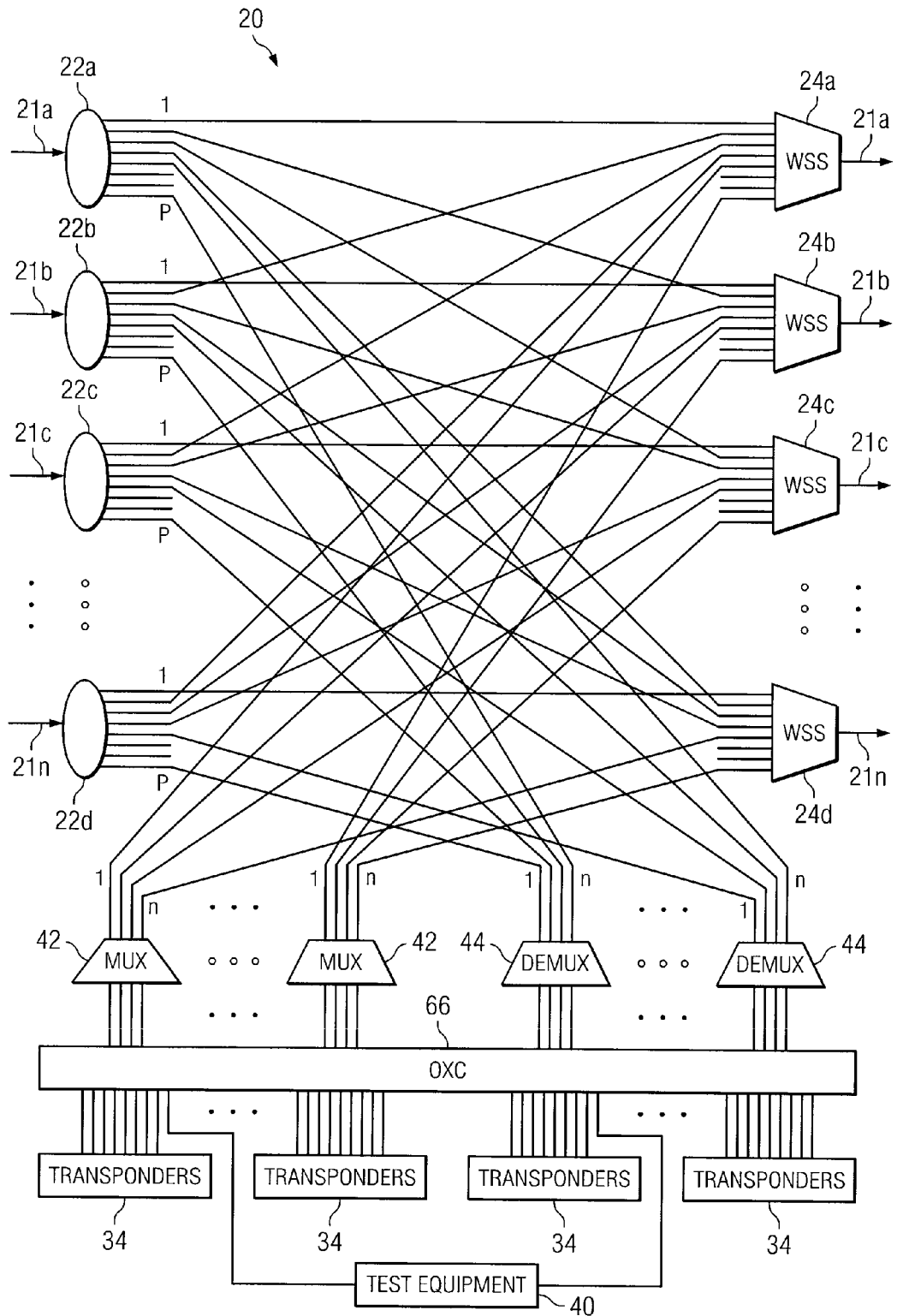
FIG. 3 is a block diagram illustrating another example node in the mesh network of FIG. 1 with an improved architecture for testing and measurement according to a particular embodiment of the present invention.

FIG. 3 is a block diagram illustrating another example node 20 in the mesh network 10 of FIG. 1 with an improved architecture for testing and measurement according to a particular embodiment of the present invention. Node 20 of FIG. 3 is similar to node 20 of FIG. 2, except that the add/drop components of node 20 of FIG. 2 are replaced with multiplexers 42, demultiplexers 44, and an optical cross-connect switch (OXC) 66. Multiplexers 42 may be identical or similar to multiplexers 30 of FIG. 2, and/or demultiplexers 44 may be identical or similar to demultiplexers 32 of FIG. 2. OXC 66 can be implemented as a single large switch, multiple small switches or any other suitable implementation. OXC 66 may be configured to forward traffic from any demultiplexer 44 to transponders 34 and/or test equipment 40, and from transponders 34 and/or test equipment 40 to any multiplexer 42. OXC 66 may provide for dynamic reconfigurability such that signals from different channels and/or different degrees may be communicated to and/or from test equipment 40. For example, OXC 66 may allow remote configuration of the pattern of connectivity between splitters 22 and transponders 34/test equipment 40, and the pattern of connectivity between transponders 34/test equipment 40 and WSSs 24.

The systems and methods described above may provide advantages over traditional approaches to testing in measurement in networks. For example, the approach described above allows for coupling test and measurement equipment to add and drop ports of a node which are "colorless" (e.g., any wavelength may be routed to or from the add or drop port coupled to the test equipment) and "steerable" (e.g., signals to or from any degree may be routed to or from the add or drop port coupled to the test equipment). This approach adds flexibility in testing and measurement as it allows sharing of the test equipment at a node among all wavelengths and degrees to be tested without the need to physically move or reconnect the test equipment, thus also improving the ability to conduct tests and measurements using remote management and control.

The approach described above also allows for in-service testing and measurement of all available channels and lightpaths for a given source-destination node pair. For example, the methods and systems described above may permit in-service testing and measurement of traffic among all available channels (e.g., all available wavelengths) and lightpaths (e.g., the path defined by fibers 12a, 12b, and 12c, the path defined by fibers 12a, 12d, and 12e, and all other suitable paths) between node 20f and node 20l depicted in FIG. 1. In certain embodiments testing, measurement and/or characterization of lightpaths may be performed prior to activating traffic service for the lightpaths. Such tests and measurements may be applied to numerous applications. For example, test and measurement results may be stored in a database, and such data may be used to aid in the establishment of service in response to a request for service between two nodes (e.g., simplifying a path search or validating a path). Such results may also be used to assist in the operation of digital coherent receivers, troubleshooting of an optical network, or any other suitable use.

As a particular example, a network administrator or other person may desire to measure latency, chromatic dispersion, polarization mode dispersion, optical-signal-to-noise-ratio and/or one or more other characteristics of lightpaths between node 20a and node 20p depicted in FIG. 1. In such a case, an item of test equipment (e.g., test equipment 40) may be coupled to an add port of node 20a and another item of test equipment may be coupled to a drop port of node 20p, as shown in FIG. 2 and/or FIG. 3. Various available lightpaths (e.g., 20a-20b-20c-20d-20h-20l-20p, 20a-20e-20i-20m-20n-20o-20p, 20a-20b-20f-20j-20k-20o-20p, or any other suitable lightpath between node 20a and node 20p) may be established one at a time for one or more available wavelengths via Generalized Multi-protocol Label Switching (GMPLS) control plane signaling or other suitable mechanism for setting up a light path. For each wavelength tested and/or measured, test equipment of node 20a may transmit a signal at the wavelength to an add port of node 20a which may then be routed through the established lightpath and received at test equipment of node 20p coupled to a drop port of node 20p. Such tests and/or measurements may be performed for each desired path and/or wavelength (e.g., to calculate the chromatic dispersion of each wavelength through each path). In certain embodiments, items of test equipment may also be placed at intermediate nodes within a lightpath to perform intermediate tests, measurements, or characterization.

Although the present invention has been described with several embodiments, various changes and modifications may be suggested to one skilled in the art. It is intended that the present invention encompass such changes and modifications as fall within the scope of the appended claims.

What is claimed is:

1. An optical node, comprising:
   a plurality of optical input components operable to receive a plurality of signals communicated in an optical network;
   a plurality of optical output components operable to transmit a plurality of signals to be communicated in the optical network; and
   at least one of:
   an optical drop component coupled to the plurality of optical input components, the optical drop component operable to select a signal and select a portion of the signal of a particular selectable wavelength to drop to an associated item of test equipment from any one of the plurality of optical input components; and
   an optical add component coupled to the plurality of optical output components and operable to selectively transmit copies of a selected one or more of a plurality of optical add signals to the plurality of optical output components, wherein the plurality of optical add signals includes a signal of a particular selectable wavelength communicated to the optical add component from an associated item of test equipment, and wherein each optical output component is operable to select a signal to communicate in the optical network received from any one of the optical add component and the plurality of optical input components.

2. The optical node of claim 1, wherein the optical drop component comprises a first wavelength selective switch (WSS) and a second WSS, the first WSS coupled to each optical input component and operable to select a signal from one of the optical input components and forward the selected signal to the second WSS, and the second WSS coupled to the first WSS and the item of test equipment and operable to select the portion of the signal of the particular selectable wavelength and forward the portion to the item of test equipment.

3. The optical node of claim 1, wherein the optical drop component comprises a demultiplexer and an optical cross-connect (OXC), the demultiplexer coupled to each optical input component and the OXC coupled to the demultiplexer and the item of test equipment and operable to select the portion of the signal of the particular selectable wavelength and forward the portion to the item of test equipment.

4. The optical node of claim 1, wherein the optical add component comprises a splitter and a wavelength selective switch (WSS), the WSS coupled to the item of test equipment and operable to selectively transmit the selected one or more of the plurality of optical add signals to the plurality of optical output components, wherein the plurality of optical add signals includes the signal of the particular selectable wavelength communicated to the WSS from the associated item of test equipment, and the splitter coupled to each optical output component and operable to receive an optical add signal from the WSS and forward a copy of the optical add signal to each of the plurality of optical output components.

5. The optical node of claim 1, wherein the optical add component comprises multiplexer and an optical cross-connect (OXC), the OXC coupled to the item of test equipment and operable to selectively transmit the selected one or more of the plurality of optical add signals to the multiplexer, and the multiplexer coupled to the plurality of optical output components and configured to forward the selected one or more of the plurality of optical add signals to the plurality of optical output components.

6. The optical node of claim 1, further comprising an optical cross-connect component operable to:
   couple the plurality of optical input components to the optical drop component;
   couple the plurality of optical output components to the optical add component; and
   couple the plurality of optical input components to the plurality of optical output components.

7. The optical node of claim 1, wherein the optical network is an optical mesh network.

8. The optical node of claim 1, further comprising the optical drop component operable to select one or more portions of the signal at wavelengths other than the particular selectable wavelength to drop to one or more associated client devices coupled to the optical drop component.

9. A method for testing an optical network comprising:
identifying a plurality of paths between a first optical node and a second optical node of the optical network;
identifying a plurality of signal wavelengths to be tested; and
for each identified path:
individually transmitting a plurality of signals from an add port of the first optical node to the second optical node via the identified path, each of the plurality of signals comprising one of the plurality of signal wavelengths;
individually receiving each of the plurality of signals at an item of test equipment coupled to a drop port of the second optical node; and
analyzing by the item of test equipment one or more optical parameters associated with each of the received plurality of signals.

10. A method according to claim 9, wherein the one or more optical parameters include at least one of optical power, chromatic dispersion, polarization mode dispersion, and optical-signal-to-noise-ratio.

11. A method according to claim 9, further comprising, for at least one of the identified paths:
individually receiving each of the plurality of signals at a second item of test equipment coupled to a drop port of an intermediate optical node coupled between the first and second node; and
analyzing by the second item of test equipment one or more optical parameters associated with each of the received plurality of signals.

12. A method according to claim 9, further comprising, for each identified path and plurality of signals, selecting, by an optical add component of the first optical node, the signal for transmission via the identified path.

13. A method according to claim 12, wherein the optical add component comprises a wavelength selective switch (WSS), and further comprising for each identified path and plurality of signals:
selecting the signal by the WSS; and
forwarding the selected signal to the second optical node with the path.

14. A method according to claim 9, further comprising, for each identified path and plurality of signals, selecting, by an optical drop component of the second optical node, the signal for analysis by the first item of test equipment.

15. A method according to claim 14, wherein the optical drop component comprises a first wavelength selective switch (WSS) and a second WSS, and further comprising for each identified path and plurality of signals:
selecting a wavelength division multiplexed (WDM) signal including the signal by the first WSS;
forwarding the WMD signal to the second WSS by the first WSS; and
selecting the signal from the WMD signal by the second WSS.

16. A method according to claim 14, wherein the optical drop component comprises a demultiplexer and an optical cross-connect (OXC), and further comprising for each identified path and plurality of signals selecting the signal from the WDM signal by the OXC.

17. The method of claim 9, wherein the optical network is an optical mesh network.

18. An optical node, comprising:
a plurality of optical input means for receiving a plurality of signals communicated in an optical network;
a plurality of optical output means for transmitting a plurality of signals to be communicated in the optical network; and
at least one of:
an optical drop means coupled to the plurality of optical input means, the optical drop component operable to select a signal and select a portion of the signal of a particular selectable wavelength to drop to an associated item of test equipment from any one of the plurality of optical input means; and
an optical add means coupled to the plurality of optical output means and operable to selectively transmit copies of a selected one or more of a plurality of optical add signals to the plurality of optical output means, wherein the plurality of optical add signals includes a signal of a particular selectable wavelength communicated to the optical add means from an associated item of test equipment, and wherein each optical output means is operable to select a signal to communicate in the optical network received from any one of the optical add means and the plurality of optical input means.

19. The optical node of claim 18, wherein the optical drop means comprises a first wavelength selective switch (WSS) and a second WSS, the first WSS coupled to each optical input means and operable to select a signal from one of the optical input means and forward the selected signal to the second WSS, and the second WSS coupled to the first WSS and the item of test equipment and operable to select the portion of the signal of the particular selectable wavelength and forward the portion to the item of test equipment.

20. The optical node of claim 18, wherein the optical drop means comprises a demultiplexer and an optical cross-connect (OXC), the demultiplexer coupled to each optical input component and the OXC coupled to the demultiplexer and the item of test equipment and operable to select the portion of the signal of the particular selectable wavelength and forward the portion to the item of test equipment.

21. The optical node of claim 18, wherein the optical add means comprises a splitter and a wavelength selective switch (WSS), the WSS coupled to the item of test equipment and operable to selectively transmit the selected one or more of the plurality of optical add signals to the plurality of optical output means, wherein the plurality of optical add signals includes the signal of the particular selectable wavelength communicated to the WSS from the associated item of test equipment, and the splitter coupled to each optical output means and operable to receive an optical add signal from the WSS and forward a copy of the optical add signal to each of the plurality of optical output means.

22. The optical node of claim 18, wherein the optical add means comprises multiplexer and an optical cross-connect (OXC), the OXC coupled to the item of test equipment and operable to selectively transmit the selected one or more of the plurality of optical add signals to the multiplexer, and the multiplexer coupled to the plurality of optical output components and configured to forward the selected one or more of the plurality of optical add signals to the plurality of optical output components.

23. The optical node of claim 18, further comprising an optical cross-connect means operable to:
couple the plurality of optical input means to the optical drop means;

couple the plurality of optical output means to the optical add means; and couple the plurality of optical input means to the plurality of optical output means.

24. The optical node of claim 18, wherein the optical network is an optical mesh network.

25. The optical node of claim 18, further comprising the optical drop means operable to select one or more portions of the signal at wavelengths other than the particular selectable wavelength to drop to one or more associated client devices coupled to the optical drop means.

* * * * *